2,888,493

α,α,ω,ω-TETRAHALO-α,ω-DINITROALKANES

Karl Klager, Monrovia, Calif., assignor to Aerojet-General Corporation, Azusa, Calif., a corporation of Ohio No Drawing. Application September 26, 1955
Serial No. 536,767

12 Claims. (Cl. 260—644)

This invention relates to a new process for the preparation of α,α,ω,ω-tetrahalo-α,ω-dinitroalkanes.

Compounds of this type are known and are reported in von Braun and Sobecky; Ber., 44, 2530 (1919). The methods for preparing these compounds have heretofore required long, tedious, carefully controlled laboratory procedures which have rendered their commercial use impractical and economically unfeasible. The method of this invention, however, proceeds with considerable ease and provides excellent yields, starting from commercially available materials.

The method of this invention proceeds in general as follows. An alkali metal salt of an α,α'-dinitrocycloalkanone is reacted with either bromine or chlorine in the presence of an alkali metal hydroxide to yield the desired tetrahalo-dinitroalkane, in accordance with the general reaction scheme set forth below:

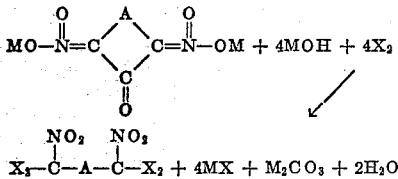

$$\text{X}_3\text{—C—A—C—X}_2 + 4\text{MX} + \text{M}_2\text{CO}_3 + 2\text{H}_2\text{O}$$
(with NO$_2$ groups on the carbons)

wherein A is an alkylene radical having from 2 to about 14 carbon atoms, M is an alkali metal and X is chlorine or bromine.

The invention will be better understood from the following examples which are provided for purposes of illustration.

EXAMPLE I

*Preparation of 1,1,4,4-tetrabromo-1,4-dinitrobutane*

One mole portion of potassium α,α'-dinitrocyclopentanone was dissolved in 30 moles of water and one and one-half moles of potassium hydroxide (20% solution) was added thereto. The solution was cooled to about 0° C. and bromine added slowly until no more bromine was absorbed and the color did not bleach out. About 4 moles of bromine were required.

A white precipitate was formed as the result of the above reaction which was filtered off and washed with water. The damp crystals were dissolved in ether and the ether solution allowed to stand over anhydrous sodium sulfate until dry. The sodium sulfate was filtered off and the filtrate collected. Hexane was added to the solution and the solution concentrated. When concentrated, crystals were formed and were recrystallized from hexane to purify them. The crystalline compound thus formed had a melting point between 100–101° C., and was identified by ultimate decomposition as 1,1,4,4-tetrabromo-1,4-dinitrobutane.

EXAMPLE II

*Preparation of 1,1,5,5-tetrabromo-1,5-dinitropentane*

One mole of the potassium salt of α,α'-dinitrocyclohexanone was dissolved in water and 4 moles of potassium hydroxide added in the form of a 20% solution. The yellow solution thus obtained was cooled to about 0° C., and treated with bromine until no more halogen was absorbed. This required about 4 moles of the halogen. A white precipitate was formed and was filtered, washed with water and dried. The dried crystals were extracted with boiling hexane and the extract concentrated and chilled in a Dry Ice acetone bath. The white crystals precipitated and on ultimate analysis, the compound was found to be 1,1,5,5-tetrabromo-1,5-dinitropentane. The melting point of the compound was between 37–38° C.

Higher homologues of the α,ω-tetrahalo-dinitroalkanes of this invention can be prepared by using higher homologues of the α,α'-dinitrocycloalkane salts and proceeding in the manner set forth in the above examples. For example, 1,1,6,6-tetrabromo-1,6-dinitrohexane is prepared from a salt of α,α'-dinitrocycloheptanone; 1,1,7,7-tetrabromo-1,7-dinitroheptane is prepared from a salt of α,α'-dinitrocyclooctanone; 1,1,9,9-tetrabromo-1,9-dinitrononane is prepared from a salt of α,α'-dinitrocyclodecanone; 1,1,10,10-tetrabromo-1,10-dinitrodecane is prepared from a salt of α,α'-dinitrocycloundecanone; 1,1,14,14-tetrabromo-1,14-dinitrotetradecane is prepared from a salt of α,α'-dinitromuscone; and 1,1,16,16-tetrabromo-1,16-dinitrohexadecane is prepared from a salt of α,α'-dinitrodihydrocivetone.

The salts employed in the above reactions can be any of the alkali metal salts of the α,α'-dinitrocycloalkanones employed as the starting material, including lithium, sodium and potassium.

The corresponding chlorine derivatives of the α,ω-tetrahalo-dinitro compounds described above are prepared in the manner set forth in the examples, by merely substituting chlorine for bromine in the disclosed procedure. For example, 1,1,4,4-tetrachloro-1,4-dinitrobutane is prepared by reacting an alkali metal α,α'-dinitrocyclopentanone with chlorine in the presence of alkali metal hydroxide; 1,1,5,5-tetrachloro-1,5-dinitropentane is prepared by reacting an alkali metal α,α'-dinitrocyclohexanone with chlorine in the presence of alkali metal hydroxide; and so on.

The entire disclosed class of compounds can be prepared by reacting appropriate starting materials in accordance with the examples and general reaction disclosed above.

The particular reaction conditions employed in the examples are not critical and can be varied over wide ranges; however, as a matter of convenience, it is preferred to employ temperatures in the range of from about 0 to about 30° C. wherever possible. It will be appreciated that when employing starting materials which are relatively insoluble, higher temperatures are necessary in order to effect solution.

The alkali metal salts of the α,α'-dinitrocycloalkanones used as starting materials in the practice of this invention are prepared by the reaction of the corresponding cycloalkanone with a lower alkyl nitrate in the presence of an alkali metal alcoholate. This method is more fully described in Wieland, Garbsch, Chavan (Ann. 461, 295–308, 1928).

The tetrahalo-dinitroalkanes prepared by the method of this invention are useful as explosives and as ballistic modifiers. The relatively low molecular weight compounds such as the butane, pentane and hexane derivatives are valuable high explosives and can be used in any conventional explosive missile, projectile, rocket or the like as the main explosive charge. An example of such a missile is disclosed in United States Patent No. 2,470,162, issued May 17, 1949. One way of using the high explosives in a device such as that disclosed in United States Patent No. 2,470,162 is to pack the crystalline explosive in powder form into the warhead of the missile. Alternatively, the crystals can be first pelletized and then packed. A charge thus prepared is sufficiently insensitive to withstand the shock entailed in the ejection of a shell from a gunbarrel or from a rocket launching tube under the pressure developed from ignition of a propellant charge, and can be caused to explode upon the operation of an impact- or time fuse-mechanism firing a detonating explosive such as lead azide or mercury fulminate.

The explosive power of the compounds decreases as the carbon chain is lengthened. The higher molecular weight compounds are primarily useful as ballistic modifiers and can be mixed with conventional explosives such as tetranitromethane, nitrocellulose or oxidizers such as ammonium nitrate in substantially stoichiometric proportions to permit complete oxidation of all of the carbon and hydrogen to water, $CO_2$ or CO without excess oxygen so as to produce an improved high explosive or to decrease the sensitivity of an explosive such as nitrocellulose. Composite high explosives of this type are useful as the main explosive charge of explosive ordnance as disclosed above.

I claim:

1. The method of preparing $\alpha,\alpha,\omega,\omega$-tetrahalo-$\alpha,\omega$-dinitroalkane compounds having the general formula:

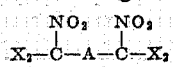

which comprises reacting a salt of a dinitrocycloalkanone having the general formula:

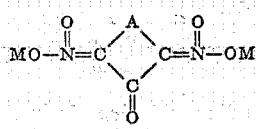

with a halogen selected from the group consisting of bromine and chlorine in aqueous solution in the presence of an alkali metal hydroxide, wherein A is an alkylene radical having from 2 to about 14 carbon atoms, X is a halogen radical selected from the group consisting of chlorine and bromine and M is an alkali metal.

2. The method of preparing $\alpha,\alpha,\omega,\omega$-tetrabromo-$\alpha,\omega$-dinitroalkane compounds having the general formula:

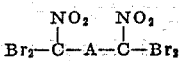

which comprises reacting a salt of a dinitrocycloalkanone having the general formula:

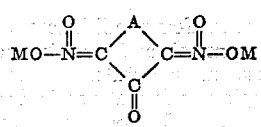

with bromine in aqueous solution in the presence of an alkali metal hydroxide, wherein A is an alkylene radical having from 2 to about 14 carbon atoms and M is an alkali metal.

3. The method of claim 2 wherein M is potassium and the alkali metal hydroxide is potassium hydroxide.

4. The method of preparing $\alpha,\alpha,\omega,\omega$-tetrachloro-$\alpha,\omega$-dinitroalkane compounds having the general formula:

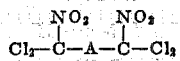

which comprises reacting a salt of a dinitrocycloalkanone having the general formula:

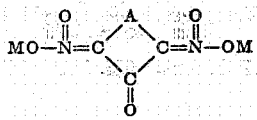

with chlorine in aqueous solution in the presence of an alkali metal hydroxide, wherein A is an alkylene radical having from 2 to about 14 carbon atoms and M is an alkali metal.

5. The method of claim 4 wherein M is potassium and the alkali metal hydroxide is potassium hydroxide.

6. The method of preparing 1,1,4,4-tetrabromo-1,4-dinitrobutane which comprises reacting potassium $\alpha,\alpha'$-dinitrocyclopentanone with bromine in aqueous solution in the presence of potassium hydroxide.

7. The method of preparing 1,1,4,4-tetrachloro-1,4-dinitrobutane which comprises reacting potassium $\alpha,\alpha'$-dinitrocyclopentanone with chlorine in aqueous solution in the presence of potassium hydroxide.

8. The method of preparing 1,1,5,5-tetrachloro-1,5-dinitropentane which comprises reacting potassium $\alpha,\alpha'$-dinitrocyclohexanone with chlorine in aqueous solution in the presence of potassium hydroxide.

9. The method of preparing 1,1,5,5-tetrabromo-1,5-dinitropentane which comprises reacting potassium $\alpha,\alpha'$-dinitrocyclohexanone with bromine in aqueous solution in the presence of potassium hydroxide.

10. The method of preparing 1,1,9,9-tetrabromo-1,9-dinitrononane which comprises reacting potassium $\alpha,\alpha'$-dinitrocyclodecanone with bromine in aqueous solution in the presence of potassium hydroxide.

11. The method of preparing 1,1,10,10-tetrabromo-1,10-dinitrodecane which comprises reacting potassium $\alpha,\alpha'$-dinitrocycloundecanone with bromine in aqueous solution in the presence of potassium hydroxide.

12. The method of preparing 1,1,14,14-tetrabromo-1,14-dinitrotetradecane which comprises reacting potassium $\alpha,\alpha'$-dinitromuscone with bromine in aqueous solution in the presence of potassium hydroxide.

References Cited in the file of this patent

Klager: Journal of Organic Chem., vol. 20, No. 5, pp. 646–649, May 1955; publ. received January 17, 1955.